United States Patent
Nishiwaki

(10) Patent No.: US 12,420,669 B2
(45) Date of Patent: Sep. 23, 2025

(54) POWER SUPPLY CONTROL DEVICE

(71) Applicant: VEHICLE ENERGY JAPAN INC., Ibaraki (JP)

(72) Inventor: Kazutaka Nishiwaki, Ibaraki (JP)

(73) Assignee: VEHICLE ENERGY JAPAN INC., Ibaraki (JP)

( * ) Notice: Subject to any disclaimer, the term of this patent is extended or adjusted under 35 U.S.C. 154(b) by 0 days.

(21) Appl. No.: 18/718,926

(22) PCT Filed: Apr. 18, 2023

(86) PCT No.: PCT/JP2023/015516
§ 371 (c)(1),
(2) Date: Jun. 12, 2024

(87) PCT Pub. No.: WO2023/204217
PCT Pub. Date: Oct. 26, 2023

(65) Prior Publication Data
US 2025/0033525 A1    Jan. 30, 2025

(30) Foreign Application Priority Data
Apr. 18, 2022 (JP) .................................. 2022-068449

(51) Int. Cl.
*B60L 58/18* (2019.01)
*H02J 7/34* (2006.01)

(52) U.S. Cl.
CPC ............... *B60L 58/18* (2019.02); *H02J 7/34* (2013.01); *B60L 2210/10* (2013.01)

(58) Field of Classification Search
None
See application file for complete search history.

(56) References Cited

U.S. PATENT DOCUMENTS

| 5,796,175 A * | 8/1998 | Itoh | H02J 9/06 307/64 |
| 2020/0282848 A1* | 9/2020 | Suzuki | H01M 8/04701 |
| 2022/0140646 A1* | 5/2022 | Takahashi | H02J 1/084 307/23 |

FOREIGN PATENT DOCUMENTS

| JP | H09-046921 A | 2/1997 |
| JP | 2003-348769 A | 12/2003 |
| JP | 2007-089350 A | 4/2007 |

OTHER PUBLICATIONS

International Search Report, mailed Jun. 27, 2023, for International Application No. PCT/JP2023/015516.

* cited by examiner

*Primary Examiner* — Rexford N Barnie
*Assistant Examiner* — Aqeel H Bukhari
(74) *Attorney, Agent, or Firm* — Baker Botts L.L.P.

(57) ABSTRACT

A power supply control device is applied to a vehicle equipped with electrical equipment, a relay connected to the electrical equipment, a first power supply that makes the relay operable, and a second power supply that discharges electricity to the electrical equipment via the relay. The device includes: a DC/DC converter that supplies electric power from the second power supply to the relay, serving as a backup for the first power supply; a third power supply charged by the first power supply, outputting the charged electric power to the relay; and a control unit that controls the DC/DC converter and second power supply. The control unit turns off the DC/DC converter when the third power supply's voltage is equal to or larger than a first threshold value and turns on the DC/DC converter when the third power supply's voltage is equal to or smaller than a second, lower threshold value.

6 Claims, 2 Drawing Sheets

POWER SUPPLY CONTROL DEVICE

TECHNICAL FIELD

The present invention relates to a power supply control device.

BACKGROUND ART

There has been conventionally known a configuration for backing up a power supply mounted on a vehicle. For example, there is disclosed a configuration that generates a backup power supply in an in-vehicle system with low current consumption by using a DC/DC converter (see, for example, PTL 1).

CITATION LIST

Patent Literature

PTL 1: Japanese Patent Application Laid-Open (Kokai) Publication No. 2003-348769

SUMMARY OF THE INVENTION

Problems to be Solved by the Invention

When a DC/DC converter is operated, electrical noise such as EMI (electro-magnetic interference), that is, electromagnetic interference (electromagnetic compatibility or electromagnetic failure), occurs in electrical equipment, so there is fear that the electrical equipment using wireless communication such as radios and televisions may be affected by it. Therefore, it is an object of the present invention to provide a power supply control device capable of suppressing the electrical noise caused by the operation of the DC/DC converter.

Means to Solve the Problems

The power supply control device of the present invention is a power supply control device applied to a vehicle which is equipped with electrical equipment, a relay connected to the electrical equipment, a first power supply that makes the relay operable, and a second power supply that discharges electricity to the electrical equipment via the relay. The power supply control device has: a DC/DC converter that supplies electric power from the second power supply to the relay and serves as a backup for the first power supply; a third power supply that is charged by the first power supply and outputs the charged electric power to the relay; and a control unit that controls operations of the DC/DC converter and the second power supply. The control unit turns off the DC/DC converter when a voltage of the third power supply is equal to or larger than a first threshold value; and the control unit turns on the DC/DC converter when the voltage of the third power supply is equal to or smaller than a second threshold value that is smaller than the first threshold value.

Advantageous Effects of the Invention

The power supply control device capable of suppressing the electrical noise caused by the operation of the DC/DC converter used as a constituent element of a backup power supply can be provided according to the present invention.

DESCRIPTION OF EMBODIMENTS

Figure 1:
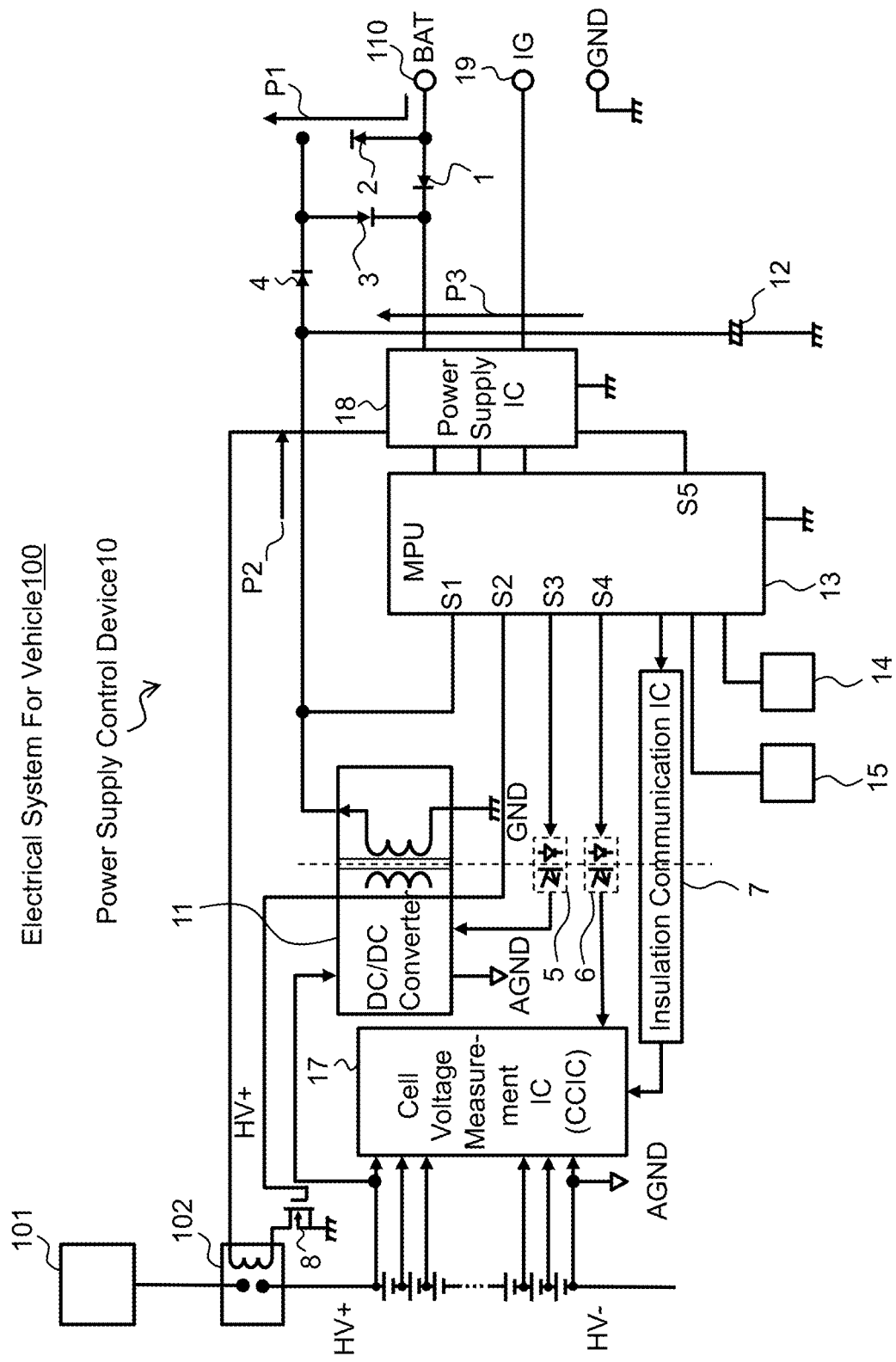
FIG. 1 is a circuit diagram of an electrical system for a vehicle to which a power supply control device according to an embodiment of the present invention is applied.

An embodiment of an electrical system for a vehicle, to which the power supply control device according to an embodiment of the present invention is applied, will be described with reference to FIG. 1.

An electrical system 100 for a vehicle includes: an inverter 101 which is electrical equipment; a relay 102 connected to the inverter 101; a lead battery 110 (an example of a first power supply) for causing the relay 102 to operate with first electric power P1; a lithium-ion battery 120 (an example of a second power supply) for discharging electricity to the inverter 101 via the relay 102; and a power supply control device 10. Examples of the electrical equipment include radios and televisions with wireless communication as well as car navigation systems. The vehicle may be an EV, HV, PHV, PHEV, or FCV (hereinafter also referred to as "EV vehicles, etc.").

The DC/DC converter 11 can output second electric power P2 supplied from the lithium-ion battery 120 for excitation to cause the relay 102 to operate. Since the second electric power P2 is a backup function when the first electric power P1 of the lead battery 110 has failed, it is circuit-configured to be capable of charging the capacitor 12 instead of the lead battery 110.

The relay 102 can, for example, open or close a large DC current with a normally open operation to close contacts only when electricity is passed. Under this circumstance, when the relay 102 is disconnected due to, for example, an inadvertent interruption of an excitation current, a large DC current is momentarily interrupted, a high voltage is thereby generated, and the inverter 101 may be damaged. Therefore, the relay 102 needs to avoid the situation where the excitation current is inadvertently interrupted. The power supply control device 10 is provided with a backup power supply to prevent such a situation.

If the lead battery 110 which supplies the excitation current of the relay 102 has failed due to, for example, battery exhaustion, the second electric power P2 connected to the lead battery 110 via an OR circuit using diodes 4 and 2 is supplied as a backup in place of the failed first electric power P1. However, due to the failure of the first electric power P1, it takes several tens of milliseconds as required time to turn on the DC/DC converter 11 and sufficiently supply the second electric power P2. As a result, the excitation current of the relay 102 continues to be in an ON state caused by the excitation of the relay 102 by supplying the third electric power P3 from the capacitor 12 without momentary interruption.

However, the third electric power P3 by the capacitor 12 can be sustained for only a few seconds at most. On the other hand, if the DC/DC converter 11 is turned on, it is possible to supply the second electric power P2 from the lithium-ion battery 120 without delay. Under this circumstance, an MPU 13 detects that the lead battery 110 has failed due to, for example, battery exhaustion, and the MPU 13 turns on the DC/DC converter 11. Accordingly, the second electric power P2 is supplied from the lithium-ion battery 120 which is capacitive.

The relay 102 should preferably be a latch relay. The latch relay has a higher power-saving effect because it is not necessary to keep the excitation current flowing and the status can be maintained by adding a signal current only when switching. The first electric power P1 is the electric power to keep the relay 102 on. The voltage of the first electric power P1 is, for example, 12 V to 13.8 V, and a transistor 8 is turned on to form an excitation drive circuit. The transistor 8 is opened or closed by a relay control signal of the MPU 13 (an example of a control unit).

The power supply control device 10 has the DC/DC converter 11, the capacitor 12 (an example of a third power supply), the control unit (for example, micro-processing unit, hereinafter also referred to as "MPU") 13, a reporting unit 14, an input unit 15, a cell voltage measurement IC (CCIC) 17, and a power supply IC 18. When a positive electrode terminal of the lead battery 110 is connected to a BAT terminal, the electric power is always supplied to the power supply IC 18 via a diode 1. An IG terminal 19 of the power supply IC 18 is connected to a vehicle operation means (which is not illustrated in the drawing) to receive an operation signal.

The MPU (control unit) 13 is a type of processor, which is also called a microprocessor, and is mounted on a microchip. The MPU 13 measures a voltage of the lead battery 110 related to the first electric power P1 and a voltage related to the second electric power P2 supplied from the lithium-ion battery 120 and, according to the measurement results, controls the operations of the relay 102, the lithium-ion battery 120, and the DC/DC converter 11.

The MPU 13 is the center of the power supply control device 10 and, in a case of a one-chip microcomputer having minimum driving power of 7 V as an example, is circuit-configurated so that stable and reliable electric power is always supplied from the lead battery 110 via the diode 1 and the power supply IC 18. However, a failure of the lead battery 110 is also assumed in the power supply control device 10. The failed lead battery 110 will be backed up by the circuit configuration of the diodes 2 to 4 as described later.

Figure 2:
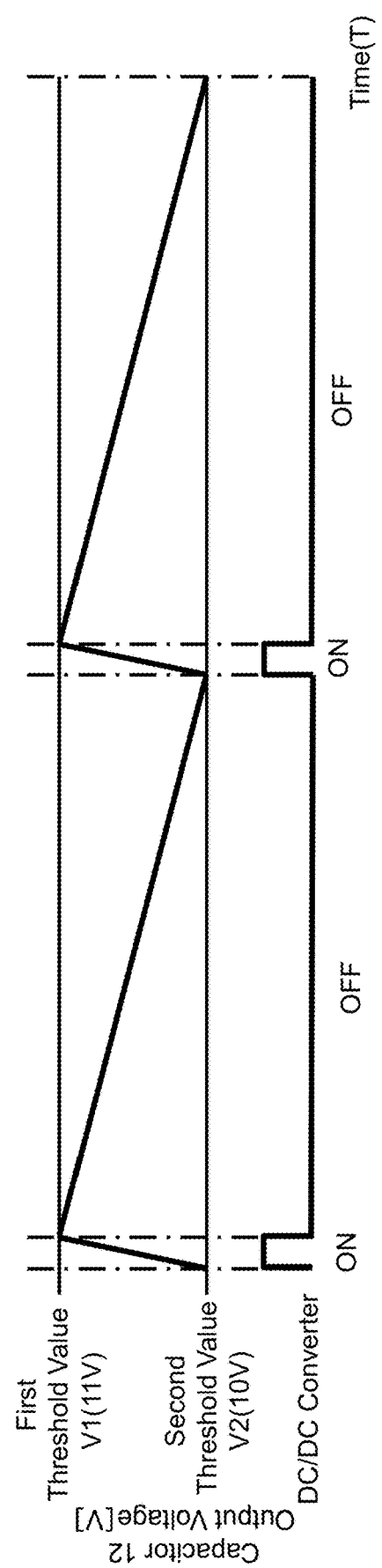
FIG. 2 is a graph illustrating charging (increasing voltage) and discharging (decreasing voltage) of a capacitor which forms a third power supply in the power supply control device in FIG. 1.

The MPU 13 controls the operation of the lithium-ion battery 120 by controlling ON/OFF of the DC/DC converter 11 as illustrated in FIG. 2 under conditions described later. The MPU 13 turns on the DC/DC converter 11 when the voltage of the third electric power P3 is equal to or smaller than a second threshold value V2 (10 V), which is smaller than a first threshold value V1 (11 V).

The MPU 13 alternately repeats a charging state and a non-charging state so that the capacitor 12 is intermittently charged from the lithium-ion battery 120. Specifically speaking, the second electric power P2 supplied from the lithium-ion battery 120 is circuit-configured so that the capacitor 12 can be charged as a backup function when the lead battery 110 has failed.

A cell voltage measurement IC (hereinafter also referred to as "CCIC") 17 not only measures cell voltages of a plurality of cell batteries, which constitute the lithium-ion battery 120, but also often has a function of a cell controller for equalizing the respective cell voltages. The CCIC 17 is charged to a high voltage, and its high voltage part sends and receives a control signal to and from the MPU 13 by means of insulating photocouplers 5 and 6 and an insulating communication IC7 while maintaining the insulating property. With this circuit configuration, a one-chip microcomputer driven by 7 V is also protected from impacts of the high voltage.

The DC/DC converter 11 can output the second electric power P2 from the lithium-ion battery 120 to the relay 102 as a backup for the lead battery 110. The second electric power P2 is the electric power to keep the relay 102 on as a backup for the lead battery 110 which has failed. The voltage of the second electric power P2 is, for example, 10 V to 11 V.

The capacitor 12 is charged by the lead battery 110 and is circuit-configured to be capable of outputting the third electric power P3 to the relay 102. The third electric power P3 is the electric power used, as a backup for the lead battery 110 which has failed, to keep the relay 102 on until the DC/DC converter 11 is activated. The voltage of the third electric power P3 is, for example, 10 V to 11 V.

As illustrated in FIG. 1, the MPU 13 controls the operations of the DC/DC converter 11 and the lithium-ion battery 120 while sending and receiving a control signal to and from the CCIC 17 and others. The MPU 13 performs: voltage measurement for monitoring a backup voltage in preparation for a predicted failure of the lead battery 110 (S1); relay control (S2); shutdown control of the DC/DC converter (S3); shutdown control of the CCIC (S4); and voltage measurement for monitoring the lead battery voltage (S5). For example, a nickel hydride battery may be used instead of the lithium-ion battery 120; and, for example, a nickel hydride battery or an alkaline battery may be used instead of the lead battery 110.

The operation of the power supply control device 10 will be described with reference to FIGS. 1 and 2. FIG. 2 is a graph showing charging (increasing voltage) and discharging (decreasing voltage) of the capacitor 12. While the DC/DC converter 11 is turned on to charge the capacitor 12, the MPU 13 turns off the DC/DC converter 11 to stop charging the capacitor 12 when the voltage of the second electric power P2 is equal to or larger than the first threshold value V1.

As shown in FIG. 2, the first threshold value V1 is, for example, 11 V. When the voltage of the capacitor 12, i.e., the third electric power P3, is equal to or smaller than the second threshold value V2 (for example, 10 V), which is smaller than the first threshold value V1, the MPU 13 turns on the DC/DC converter 11 to resume charging the capacitor 12.

Furthermore, the MPU 13 causes the capacitor 12 to alternately repeat a charged state and a non-charged state so that the capacitor 12 is intermittently charged from the lithium-ion battery 120. Specifically speaking, the circuit illustrated in FIG. 1 is configured so that the second electric power P2 supplied from the lithium-ion battery 120 can charge the capacitor 12 as a backup function when the lead battery 110 has failed.

Moreover, when the lead battery 110 which supplies the excitation current to the relay 102 has failed due to, for example, battery exhaustion, the third electric power P3 is momentarily supplied from the capacitor 12, which is connected to the lead battery 110 via the OR circuit by means of the diodes 2 and 4 in place of the failed first electric power P1, so that the ON state of the relay 102 continues.

Furthermore, the MPU 13 turns off the DC/DC converter 11 when the voltage of the third electric power P3 is equal to or larger than the first threshold value V1; and the MPU 13 turns on the DC/DC converter 11 when the voltage of the third electric power P3 is equal to or smaller than the second threshold value V2.

The reporting unit 14 reports any anomaly of the lead battery 110 when the second electric power P2 is output beyond a specified amount of time. The anomaly of the lead battery 110 is, for example, a failure or a disconnection. The reporting unit 14 outputs the anomaly via an output device such as a monitor or a speaker which is mounted in the vehicle. The input unit 15 makes it possible to input in order to change the first threshold value V1 and the second threshold value V2.

As long as the lead battery 110 does not fail, the contacts of the relay 102 are always closed by the first electric power P1 of the lead battery 110. The first electric power P1 is the electric power to keep the relay 102 on, and the voltage is set to 12 V. The lithium-ion battery 120 supplies the electric power to the inverter 101 via the relay 102 in the ON state.

The lithium-ion battery 120 outputs the second electric power P2 whose voltage has been decreased by the DC/DC converter 11 under the control of the MPU 13. The lithium-ion battery 120 does not discharge electricity to the DC/DC converter 11 until the lead battery 110 fails. The second electric power P2 is the electric power used, as a backup for the lead battery 110 which has failed, to keep the relay 102 on and the voltage is set between 10 V and 11 V.

The voltage value (10 V to 11 V) of the second electric power P2 is set lower than the voltage value (12 V) of the first electric power P1. The path for supplying the excitation current to the relay 102 constitutes an OR circuit where the cathode sides of the two diodes 2 and 4 are connected. The first electric power P1 is supplied to the anode side of one diode 2 in this OR circuit, and the second electric power P2 is supplied to the anode side of the other diode 4. Therefore, this OR circuit backs up the first electric power P1 with the second electric power P2 and does not cause outage of the excitation current of the relay 102.

The capacitor 12 is charged by the second electric power P2 which is the output of the DC/DC converter 11. The capacitor 12 outputs the third electric power P3 to the relay 102. The third electric power P3 is the electric power to keep the relay 102 on until the DC/DC converter 11 is activated as a backup for the failed lead battery 110, and the voltage is set between 10 V and 11 V.

The capacitor 12 is charged by the second electric power P2 which is the output of the DC/DC converter 11 while the voltage value increases from 10 V, which is the second threshold value V2, to 11 V, which is the first threshold value V1, within a short amount of time such as a few seconds. After that, the DC/DC converter 11 is turned off under the control of the MPU 13, and charging by the second electric power P2 is stopped in the capacitor 12. Therefore, the capacitor 12 discharges electricity, for example, by means of natural discharge while the voltage value decreases from 11 V, which is the first threshold value V1, to 10 V, which is the second threshold value V2, gradually over several minutes.

When the voltage value of the capacitor 12 decreases, the DC/DC converter 11 is turned on (restarted) under the control of the MPU 13. As a result, the capacitor 12 is charged again by the second electric power P2 while the voltage value increases from 10 V, which is the second threshold value V2, to 11 V, which is the first threshold value V1, within a short amount of time such as a few seconds.

Only during this short amount of time such as the few seconds, discharge from the lead battery 110 to the capacitor 12 is restarted. Therefore, discharge from the lead battery 110 to the capacitor 12 is performed only for the short amount of time when the voltage value of the capacitor 12 increases from 10 V to 11 V.

When the first electric power P1 is stopped due to a failure of the lead battery 110, the third electric power P3 is firstly supplied from the capacitor 12 to the relay 102. Next, the second electric power P2 is supplied from the DC/DC converter 11 to the relay 102. Specifically speaking, the capacitor 12 serves as a backup power supply for the lead battery 110 for a short amount of time until the DC/DC converter 11 is activated. The lithium-ion battery 120 then serves as a backup power supply for the lead battery 110.

As illustrated in FIG. 2, the DC/DC converter 11 is activated only for a short amount of time. Therefore, EMI noise caused by the operation of the DC/DC converter 11 is generated only for the short amount of time, and vehicle-mounted devices such as a radio and a television will be hardly affected by the EMI noise.

Next, the actions and effects of the power supply control device 10 will be described.

[1] The lead battery 110 supplies the first electric power P1. The first electric power P1 is supplied for the excitation purpose to cause the relay 102 to operate, for the purpose of driving the MPU 13 which is similar to a computer, and for the purpose of driving part of the electrical equipment. The part of the electrical equipment herein mentioned can be considered as a 12-V system electrical component(s). On the other hand, the lithium-ion battery 120 is, for example, a 40-V system storage battery configured, for example, in series and parallel. The capacitor 12 is charged by the lead battery 110 and is configured to be capable of outputting the third electric power P3 for the excitation purpose to cause the relay 102 to operate.

The capacitive second electric power P2, instead of the first electric power P1 of the lead battery 110, continues the ON state by the excitation of the relay 102, the driving of the MPU 13, and the driving of the inverter 101 for a long time. For the lead battery (12 V to 13.8 V), the second threshold value V2 (10 V) is set at a level for detecting its failure. In the case of an EV vehicle or the like, for example, this state is the situation where the operation should be continued to prompt charging of the lead battery 110 even if the operation is not necessary, or the lead battery 110 should be replaced with a new one at a maintenance site or the like or should be supplementarily charged.

In this way, in addition to the case where the lead battery 110 has failed due to, for example, battery exhaustion, the electric power is output only for charging intermittently for a very short amount of time to supplement the voltage decrease caused by natural discharge of the capacitor 12, as illustrated in FIG. 2. If the DC/DC converter 11 is turned on only for such a short time, the electrical noise generated by it may be considered acceptable.

In other words, during normal operation of a vehicle equipped with the power supply control device 10, the DC/DC converter 11 is turned off for the most part as illustrated in FIG. 2, so that no electrical noise will be generated by it. Therefore, according to the power supply control device 10, the electrical noise caused by the operation of the DC/DC converter 11 used as a constituent element of the backup power supply can be suppressed.

[2] In [1] above, the power supply control device 10 is applied to a vehicle equipped with a normally open-type relay 102 which is highly versatile as it is configured to close contacts only when the electricity is passed. Such power supply control device 10 cannot maintain the ON state by the excitation of the relay 102 due to the occurrence of a failure of the electrical system. The relay 102 is basically safe because it is interposed between the lithium-ion battery 120 and the inverter 101 and blocks the main current, for example, a large DC current by a normally open operation.

[3] In [1] above, the power supply control device 10 may be applied to a vehicle equipped with a normally closed-type relay 102 (the same reference number) configured to open contacts only when the electricity is passed. Such power supply control device 10 may be reprogrammed to reverse and output the relay control logic of the MPU 13. Otherwise, it can be easily realized by reassembling the excitation drive circuit of the transistor 8 into a circuit which operates to reverse ON/OFF or by interposing a NOT operation circuit (which is not illustrated in the drawing) which operates to reverse ON/OFF of the excitation circuit.

Furthermore, there is also another operation type of the relay 102 (the same reference number), that is, a latch type which can maintain the operation after switching without the excitation current if only a switching signal is inputted. In this case, the excitation drive circuit by the transistor 8 is no longer required, and the logic of the relay control of the MPU 13 may be reprogrammed to output only the switching signal and cause the MPU 13 to monitor the ON/OFF state of the relay 102. In this way, the power supply control device 10 can be applied to a wide range of embodiments without limiting the operation type of the relay 102.

[4] In any one of [1] to [3] above, the power supply control device 10 further includes a reporting unit 14 that reports specified information. When the second electric power P2 of the DC/DC converter 11 is output beyond a specified amount of time, the reporting unit 14 reports, for example, to a passenger(s) of the vehicle that an anomaly has occurred in the lead battery 110. With this configuration, for example, the passenger(s) of the vehicle can recognize that an anomaly has occurred in the lead battery 110.

Moreover, the passenger(s) of the vehicle can deal with the occurrence of the anomaly in the lead battery 110 by, for example, asking a vehicle repair shop for consultation. If the normal state continues and there is no anomaly in the lead battery 110, the second electric power P2 from the lithium-ion battery 120 is output only for the purpose of charging intermittently for a very short amount of time to supplement the voltage decrease caused by natural discharge of the capacitor 12, as illustrated in FIG. 2. On the other hand, if any anomaly occurs in the lead battery 110, the reporting by the reporting unit 14 enables the passenger(s) of the vehicle, for example, to become aware of the anomaly at an early stage and suppress the worsening of the situation.

[5] In any one of [1] to [4] above, the MPU 13 is operated by the first electric power P1. The MPU 13 is often, for example, a one-chip microcomputer with minimum driving power of 7 V. Moreover, the first electric power P1 of the lead battery 110 is often supplied at 12 V to 13.8 V. In such a case, the voltage of the second electric power P2 from the lithium-ion battery 120 (for example, 40 V) is too high for driving the MPU 13 (for example, about 10 V), so the intervention of the DC voltage conversion function is essential.

Therefore, the power supply control device 10 directly causes the MPU 13 to operate by using the first electric power P1 which does not require the intervention of the DC voltage conversion function, so that it is simpler and easier to do so in the above-described manner. As a result, since the power supply control device 10 can reduce opportunities for the DC/DC converter 11 to operate, it can suppress the electrical noise caused by that operation.

As long as the power supply control device 10 having such a configuration does not fail, it can be operated by the lead battery 110 without receiving the supply of the electric power from the lithium-ion battery 120. As a result, the opportunities for the DC/DC converter 11 to operate can be reduced, so that the electrical noise caused by that operation can be suppressed.

[6] In any one of [1] to [5] above, an input unit 15 capable of changing at least one of the first threshold value V1 (11 V) and the second threshold value V2 (10 V) is further provided. With this configuration, at least one of the first threshold value V1 and the second threshold value V2 can be changed in consideration of, for example, the frequency of the ON/OFF control of the DC/DC converter 11 by the MPU 13. Advantages of changing this will be described below.

If the setting of the above threshold value is changed to a much lower value, the opportunities for the DC/DC converter 11 to operate can be reduced and the power supply control device 10 can suppress the electrical noise caused by that operation. Accordingly, in order to change the setting of the threshold value to the much lower setting, it is only necessary to set conditions for alleviating the backup system for the lead battery 110 while maintaining the availability of the inverter 101.

The following examples can be considered as the conditions for alleviating the backup system for the lead battery 110. The current EV vehicle or the like also includes a lead battery 110 of much lower voltage and smaller capacity other than and in addition to the lithium-ion battery 120. This lead battery 110 is still indispensable as a power supply for electrical components other than the main motor; and while it cannot be reduced abruptly, there is a possibility that the degree of dependence on it can be reduced gradually with the expected technological innovation.

As a specific example of reducing the dependence, if not only lights to which the electric power is supplied from the lead battery 110 are replaced with LED lights, but also the relay 102 is replaced with a latch-type relay, the excitation current will become no longer necessary and the energy saving for the lead battery 110 will advance, so that the dependence on it will be reduced. Moreover, since the EV vehicle does not have an internal combustion engine that generates heat, the installation environment of the lead battery 110 has lower temperature. As a result, the deterioration of the lead battery 110 will be suppressed and its reliability will be improved.

Furthermore, it is also possible that the lead battery 110 itself may be improved to achieve much higher performance. Alternatively, it is also possible that the power supply voltage of the in-vehicle electrical components will be unified sequentially from the rated output of the current lead battery 110 (12 V to 13.8 V) to a voltage matching the specifications of the lithium-ion battery 120. Accordingly, if the degree of dependence on the lead battery 110 is reduced, it is preferable that with the power supply control device 10 applied to an EV vehicle or the like, a repair shop worker should be capable of changing the setting of the above-mentioned threshold value to a lower value via the input unit 15.

REFERENCE SIGNS LIST 1 to 4: diodes
5, 6: insulated photo couplers
7: insulated communication IC
8: transistor
10: power supply control device
11: DC/DC converter
12: capacitor (an example of the third power supply)

13: MPU (an example of the control unit)
14: reporting unit
15: input unit
17: cell voltage measurement IC (CCIC)
18: power supply IC
19: IG terminal
100: electrical system for a vehicle
101: inverter (and other electrical equipment using wireless communication)
102: relay
110: lead battery (an example of the first power supply)
120: lithium-ion battery (an example of the second power supply)
P1: first electric power that is the electric power to keep the relay 102 on (voltage: 12 V to 13.8 V)
P2: second electric power that is the electric power to keep the relay 102 on as a backup for the lead battery 110 which has failed (voltage: 10 V to 101V)
P3: third electric power that is the electric power to keep the relay 102 on as a backup for the failed lead battery 110 and be used until the DC/DC converter 11 is activated (voltage: 10 V to 11 V)
V1: first threshold value (11 V)
V2: second threshold value (10 V)

The invention claimed is:

1. A power supply control device applied to a vehicle equipped with:
   electrical equipment;
   a relay connected to the electrical equipment;
   a first power supply that makes the relay operable; and
   a second power supply that discharges electricity to the electrical equipment via the relay,
   the power supply control device comprising:
   a DC/DC converter that supplies electric power to the relay from the second power supply as a backup for the first power supply;
   a third power supply that is charged by the first power supply and outputs the charged electric power to the relay; and
   a control unit that controls operations of the DC/DC converter and the second power supply,
   wherein the control unit turns off the DC/DC converter when a voltage of the third power supply is equal to or larger than a first threshold value; and
   wherein the control unit turns on the DC/DC converter when the voltage of the third power supply is equal to or smaller than a second threshold value, which is smaller than the first threshold value.

2. The power supply control device according to claim 1, wherein the power supply control device is applied to the vehicle equipped with the relay configured to close contacts.

3. The power supply control device according to claim 1, wherein the power supply control device is applied to the vehicle equipped with the relay configured to open contacts only when electricity is passed.

4. The power supply control device according to claim 1, further comprising a reporting unit that reports specified information,
   wherein the reporting unit reports an anomaly in the first power supply when the DC/DC converter is kept turned on beyond a specified amount of time.

5. The power supply control device according to claim 1, wherein the control unit is caused by the first power supply to operate.

6. The power supply control device according to claim 1, further comprising an input part capable of changing at least one of the first threshold value and the second threshold value.

* * * * *